Figure 1:
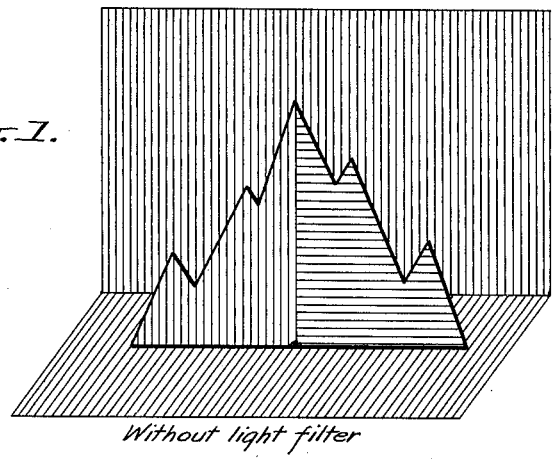

Dec. 1, 1931.    A. SCHILLING    1,834,257

PRODUCTION OF CINEMATOGRAPHIC TRANSFORMATION AND TRICK EFFECTS

Filed April 3, 1928

Without light filter

With red light filter

With blue light filter

Inventor:
Andreas Schilling
By Byrnes, Townsend
& Brickenstein
Attorneys.

Patented Dec. 1, 1931

1,834,257

UNITED STATES PATENT OFFICE

ANDREAS SCHILLING, OF DESSAU IN ANHALT, GERMANY, ASSIGNOR, BY MESNE ASSIGNMENTS, TO AGFA ANSCO CORPORATION, OF BINGHAMTON, NEW YORK, A CORPORATION OF NEW YORK

PRODUCTION OF CINEMATOGRAPHIC TRANSFORMATION AND TRICK EFFECTS

Application filed April 3, 1928, Serial No. 267,136, and in Germany March 5, 1927.

The present invention relates to a process for taking cinematographic transformation and trick effects.

It comprises a process which effects such trick exposures by simple means, and which opens to the cinematographer new possibilities in technique. It is based on the conception, that by the use of films panchromatically sensitized or sensitized to certain portions of the spectrum, together with light filters of definite spectral absorption and intensity of transmission, objects which are in the field of view of the camera may nevertheless be excluded from the picture, by covering the objects with a color which reflects substantially monochromatic light, which light is not transmitted by the light filter used. The spectral transmission of the filter and the spectral composition of the light reflected by the color used must be in such a relation to the sensitivity of the film, that while the objects the colors of which do not correspond to the spectral transmission of the filter used, will make no impression on the film, all other objects in the field of view of the camera will be taken without any special color treatments.

A transformation exposure can, for instance, be made in the following way:

An object to be photographed, say a dancer is clothed in a dress which is partly colored in red and blue, for instance, the left arm and the right leg are blue while the right arm and the left leg are red and the body is stained unsymmetrically in red and blue. Firstly pictures are taken of the dancer moving in front of a red background on a panchromatic film without any light filter and the whole dancer and the background are recorded on the film. Now a red light filter is put before the lens. Thus the blue portions (left arm, right leg and blue stains on the body) are screened out and only the rest and the background are reproduced on the film. The screened out portions are still recorded in form of dark shadows due to the red color of the background. When the red light filter is changed for a blue one the red background as well as the red colored portions of the dancer's dress are screened out and the film shows the blue portions only. This time not even shadows of the red portions are visible since the red background too is not recorded. Pictures produced in this way present a rather fantastic effect and the process herebefore described is likely to become very useful in motion picture trick work.

In order to obtain a complete screening out of the portions not to be recorded it is necessary that the absorption spectra of the light filters and of the dyes the object to be photographed is colored with truly correspond to each other, i. e. that the said dyes practically absorb light of the same wave lengths as the light filters of the same color.

By means of such a method of exposure it is possible, by interposing a suitable light filter, to obtain on photographic layers sensitized panchromatically or sensitized only to certain portions of the spectrum, a negative of a scene, which has been partly colored by the use of suitable colors or colored materials, which negative contains only those objects whose colors are transmitted by the filter used.

Figure 2:
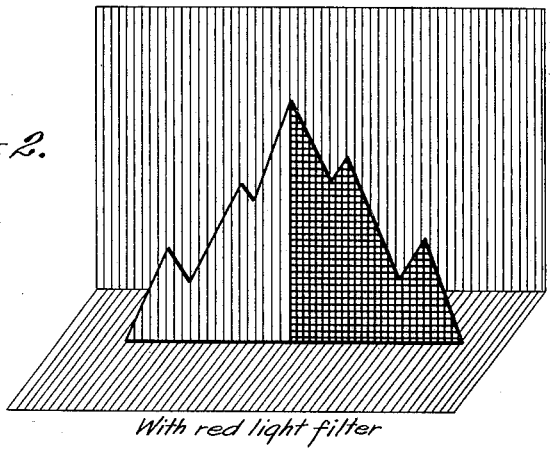
Figure 3:
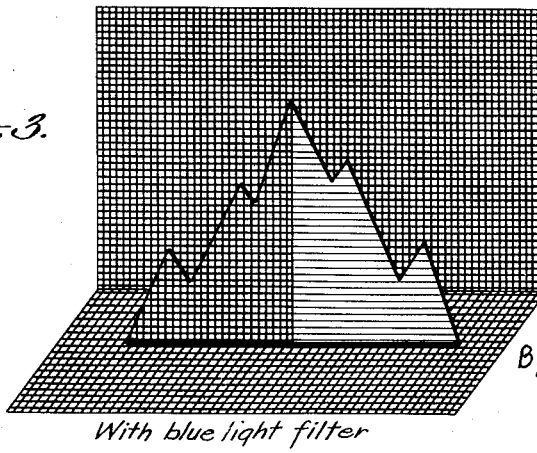

In the accompanying drawing there is shown a background with a jagged plane standing before. Fig. 1 represents the whole as it is seen by the human eye. The plane is colored in two colors (vertical lines=red; horizontal lines=blue), the background is tinted entirely in one of these colors (red). Fig. 2 shows the photographic image of this object, when taken through a red light filter, Fig. 3 shows the same when taken through a blue filter. The cross lined areas indicate those parts of the object which in the positive image appear dark or black.

I claim:

1. A process for taking cinematographic transformation and trick effects which comprises successively exposing consecutive frame sections of a sensitized photographic layer to a scene containing one or more portions so colored that they reflect substantially monochromatic light and in the course of said successive exposure interposing between the photographic layer and the scene a light filter which absorbs light of the wave lengths of the light reflected by at least one of the said colored portions, whereby a certain group of said frame sections will be exposed directly and the next group through said light filter.

2. A process for taking cinematographic transformation and trick effects which comprises successively exposing consecutive frame sections of a sensitized photographic layer to a scene containing several portions so colored that they reflect substantially several kinds of monochromatic light, in the course of said successive exposure interposing between the photographic layer and the scene a light filter which absorbs the light of the wave lengths reflected by some of said colored portions and thereafter, while continuing said successive exposure, interposing between the photographic layer and the scene a different light filter which absorbs the light of the wave lengths reflected by different colored portions of the scene, whereby a certain group of said frame sections will be exposed directly, the next group through the first of said light filters and the next group through the second different light filter.

In testimony whereof, I affix my signature.

ANDREAS SCHILLING.